United States Patent [19]

Koyama

[11] Patent Number: 4,528,604
[45] Date of Patent: Jul. 9, 1985

[54] TAPE END DETECTING DEVICE IN A RECORDING AND/OR REPRODUCING APPARATUS FOR A MINIATURE TYPE TAPE CASSETTE

[75] Inventor: Tsuneyuki Koyama, Yokohama, Japan

[73] Assignee: Victor Company of Japan Ltd., Japan

[21] Appl. No.: 504,171

[22] Filed: Jun. 14, 1983

[30] Foreign Application Priority Data

Jun. 15, 1982 [JP] Japan ............... 57-102901

[51] Int. Cl.³ ............... G11B 15/22
[52] U.S. Cl. ............... 360/74.2
[58] Field of Search ............... 360/74.2, 85, 95

[56] References Cited

U.S. PATENT DOCUMENTS 4,091,426  5/1978  Umeda ............... 360/74
4,302,786 11/1981  Takeuchi ............... 360/74.2
4,370,684  1/1983  Kanayama et al. ............... 360/74.2

FOREIGN PATENT DOCUMENTS

2020471 11/1979 United Kingdom ............... 360/74.2

Primary Examiner—George G. Stellar
Attorney, Agent, or Firm—Andrus, Sceales, Starke & Sawall

[57] ABSTRACT

A tape end detecting device in recording and/or reproducing apparatus for a miniature type tape cassette comprises a rotation detecting circuit for detecting rotation of a supply reel and a take-up reel of the miniature type tape cassette and producing rotation detection signals in accordance with the rotation of the supply reel and the take-up reel, and a control circuit for carrying out counting with a predetermined time interval according to the rotation detection signals from the rotation detecting circuit during a tape rewinding or tape fast-forwarding mode of the recording and/or reproducing apparatus and stopping the tape rewinding or tape fast-forwarding mode when a count within the predetermined time interval is zero. The supply reel and the take-up reel stop rotating when all of the tape is fed out from one reel to the other reel and an end of the tape is reached. The rotation detecting circuit produces no rotation detection signal when the reels stop rotating.

7 Claims, 5 Drawing Figures

TAPE END DETECTING DEVICE IN A RECORDING AND/OR REPRODUCING APPARATUS FOR A MINIATURE TYPE TAPE CASSETTE

BACKGROUND OF THE INVENTION

The present invention generally relates to tape end detecting device in recording and/or reproducing apparatuses for miniature type tape cassettes, and more particularly to a tape end detecting device for detecting an end of a tape which is accommodated within a miniature type tape cassette, in a tape rewinding and fast-forwarding modes of a recording and/or reproducing apparatus which carries out recording and/or reproduction when loaded with the miniature type tape cassette.

As a device for detecting an end of a cassette tape which is drawn out from a cassette case and loaded unto a predetermined tape path in a recording and/or reproducing apparatus for recording and/or reproduction of a video signal, there was a device disclosed in a U.S. Pat. No. 4,091,426 entitled "DEVICE FOR DETECTING AN END OF A CASSETTE TAPE" in which the assignee is the same as that of the present application. A tape cassette employed in this tape end detecting device comprises a first reel having an opaque tape wound thereon, with one end of the tape connected to a transparent first leader which is fixed at its other end to the hub of the reel. A second reel receives the tape as it is wound. This tape is connected to one end of a second transparent leader which is fixed at its other end to the second reel hub. A cassette case containing the reels has first and second windows in at least one side wall, and a hole for receiving a light-emitting element at an intermediate position between the first and second windows. The tape end detecting device comprises a light-emitting element which is inserted into the hole in the above cassette case, and first and second light-receiving elements respectively disposed on opposite sides of the tape, relative to the first and second windows. The first light-receiving element receives the light passing through the first leader and the first window when the first leader assumes a position intercepting a light path connecting the light-emitting element and the first light-receiving element, to detect an end of the tape at the first reel. The second light-receiving element receives the light passing through the second leader and the second window when the second leader assumes a position intercepting a light path connecting th light-emitting element and the second light-receiving element, to detect an end of the tape at the second reel.

According to this known tape end detecting device, it is also possible to detect the end of the tape during tape rewinding and fast-forwarding modes of the recording and/or reproducing apparatus when the tape is accommodated within the cassette case, in a manner similar to the case where the tape is drawn out of the cassette case and loaded unto a predetermined tape path within the recording and/or reproducing apparatus for carrying out normal recording and reproduction.

On the other hand, a miniature type tape cassette was proposed in a U.S. patent application Ser. No. 322,766 filed Nov. 19, 1981 in which the assignee is the same as that of the present application. This proposed miniature type tape cassette has a volume which is reduced to approximately ⅛ that of the normal tape cassette which cooperates with the known tape end detecting device described heretofore, and such a miniature type tape cassette has been reduced to practice. The miniature type tape cassette has a considerably compact design, and in a cassette case of this miniature type tape cassette, there is no space to provide a hole which corresponds to the hole for receiving the light-emitting element in the cassette case of the normal tape cassette.

Accordingly, in a recording and/or reproducing apparatus designed exclusively for the above miniature type tape cassette, the tape end detecting device is designed to detect the end of the tape which is drawn out of the miniature type tape cassette and loaded into a predetermined tape path in the recording and/or reproducing apparatus. Specifically, in such a tape end detecting device, a light-emitting element and a light-receiving element are provided opposing each other across the predetermined tape path, at a position close to the miniature type tape cassette. Thus, the end of the tape is detected when the transparent leader reaches a position between the opposing light-emitting element and light-receiving element.

However, the load on the tape is large when the tape travels in the above predetermined tape path. For this reason, when the recording and reproduction is not carried out and the tape is simply moved at a high speed as in the tape rewinding and fast-forwarding modes of the recording and/or reproducing apparatus, the tape is unloaded from the predetermined tape path to be accommodated within the cassette case of the miniature type tape cassette before moving the tape at the high speed. Hence, in the recording and/or reproducing apparatus designed exclusively for the miniature type tape cassette, it was impossible to detect the end of the tape during the tape rewinding and fast-forwarding modes of the recording and/or reproducing apparatus.

SUMMARY OF THE INVENTION

Accordingly, it is a general object of the present invention to provide a novel and useful tape end detecting device in a recording and/or reproducing apparatus for a miniature type tape cassette, in which the above described disadvantages have been overcome.

Another and more specific object of the present invention is to provide a tape end detecting device capable of detecting an end of a tape in a state where the tape is inside a cassette case of a miniature type tape cassette. The tape end detecting device according to the present invention detects the end of the tape, by detecting the stoppage of rotation of a reel (spool). The tape end detecting device according to the present invention is especially suited for use with respect to the miniature type tape cassette because there is no need for a light-emitting element to enter within the cassette case, and the end of the tape can be detected in tape rewinding and fast-forwarding modes of the recording and/or reproducing apparatus when the tape is inside the cassette case.

Other objects and further features of the present invention will be apparent from the following detailed description when read in conjunction with the accompanying drawings.

DETAILED DESCRIPTION

Figure 1:
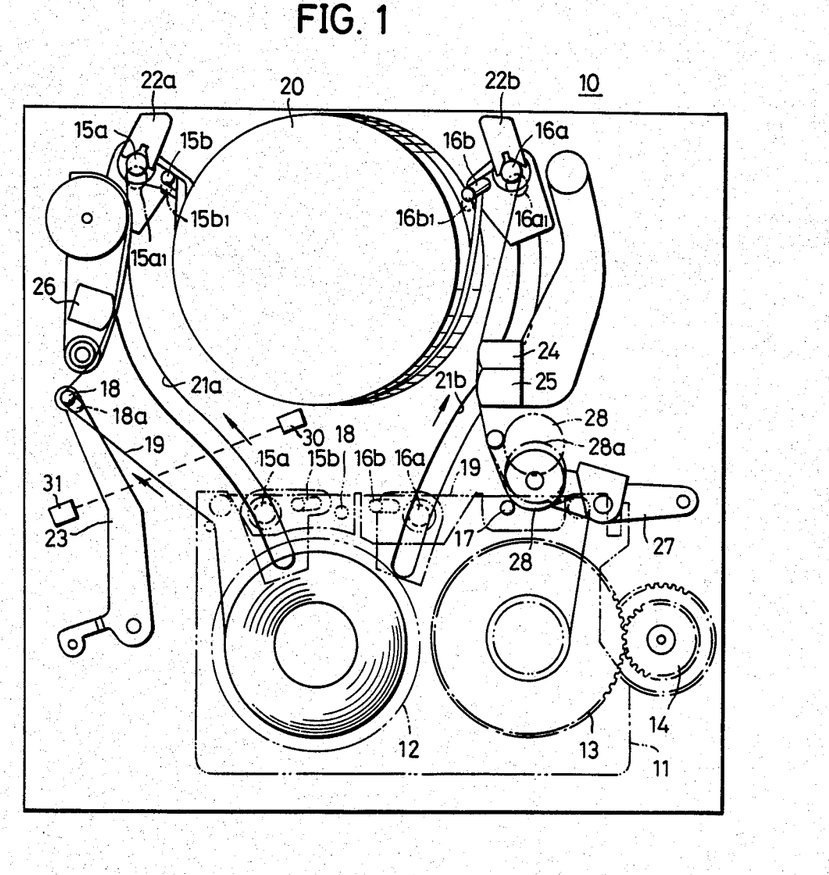
FIG. 1 is a plan view showing an example of a recording and/or reproducing apparatus for a miniature type tape cassette, applied with a tape end detecting device according to the present invention.

First, when setting the mode of a video signal recording and/or reproducing apparatus 10 to a recording mode, a miniature type tape cassette 11 is loaded into a predetermined position within the apparatus 10 as shown in FIG. 1. In the present embodiment of the invention, the tape cassette 11 is a miniature type tape cassette, and a reel shaft 29 on a reel base of the apparatus 10 is inserted into a center hole in a hub of a supply reel 12 of the loaded tape cassette 11. On the other hand, a take-up reel 13 of the loaded tape cassette 11 has gear formed on the peripheral edge of a lower flange thereof. The gear formed on the peripheral edge of the lower flange of the take-up reel 13 meshes with a rotation transmitting gear 14, and the take-up reel 13 is rotated by way of this rotation transmitting gear 14. In this state, guide poles 15a and 15b, guide poles 16a and 16b, a capstan 17, and a tension pole 18 are all inserted on the inner side of a tape 19, as indicated by a two-dot chain line in FIG. 1.

Figure 2:
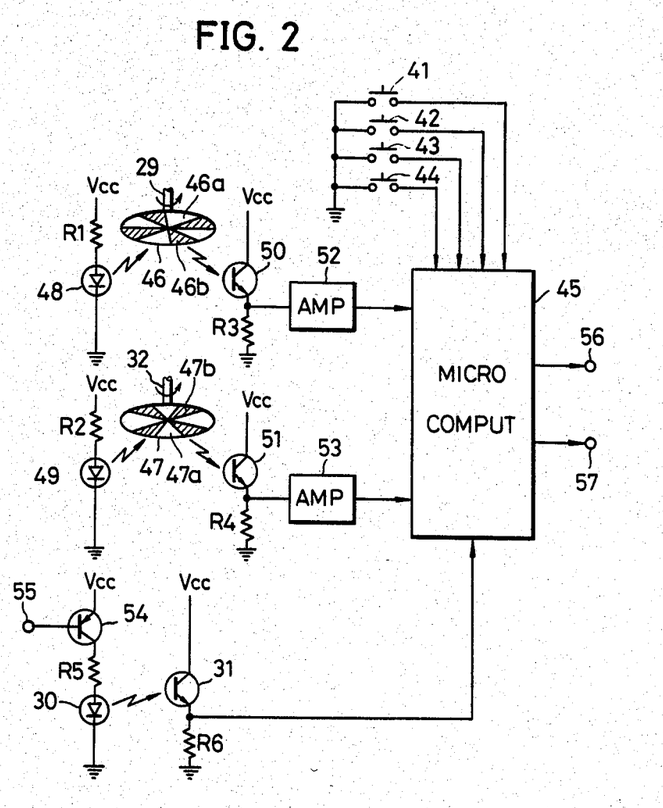
FIG. 2 is a systematic circuit diagram showing an embodiment of a tape end detecting device according to the present invention.

In the above state, a power source switch (not shown) and a play switch 41 shown in FIG. 2 are manipulated and turned ON. By such manipulation of these switches, a power source is turned ON and a rotary drum driving circuit and a loading mechanism driving circuit are operated by outputs of a microcomputer 45. A stop switch 44 stops the operation of the recording and/or reproducing apparatus 10. The operation of the microcomputer 45 will be described hereinafter in conjunction with flow charts. A rotary guide drum 20 is rotated by the operation of the rotary drum driving circuit. As the loading mechanism driving circuit operates, the guide poles 15a and 15b and the guide poles 16a and 16b at the positions indicated by the two-dot chain line respectively move to positions indicated by a solid line, along grooves 21a and 21b provided in a chassis. When the guide poles 15a and 15b and the guide poles 16a and 16b are at the positions indicated by the solid line, upper and lower end parts of the guide poles 15a and 16a respectively make contact with stoppers 22a and 22b, and are positioned by these stoppers 22a and 22b. The guide poles 15a and 15b and the guide poles 16a and 16b intercept the tape 19 and draw the tape 19 out of the tape cassette 11, as the guide poles 15a and 15b and the guide poles 16a and 16b move along the grooves 21a and 21b. The tension pole 18 also moves to a position indicated by the solid line according to the rotation of a lever 23 as the guide poles move along the grooves 21a and 21b, and makes contact with the tape 19 on the inner side of the tape 19. In addition, an erasing head 24 and an audio signal and control signal recording and/or reproducing head 25 which were at receded positions move to positions shown in FIG. 1, and respectively make contact with the tape 19. Accordingly, the tape 19 is loaded into a predetermined tape path in which the tape 19 is fed out from the supply reel 12, makes contact with a full-width erasing head 26, obliquely makes contact with the rotary drum 20 over an angular range slightly larger than 180°, makes contact with the heads 24 and 25, and reaches the take-up reel 13.

A forward direction tape driving circuit is operated by an output of the microcomputer 45, and a lever 27 is accordingly rotated. Thus, a pinch roller 28 which was at a position indicated by the two-dot chain line moves to a position indicated by the solid line. Accordingly, the tape 19 which is pinched between the rotating capstan 17 and the pinch roller 28 is driven in the forward direction, and taken up by the take-up reel 13 which is driven in rotation by the rotating gear 14.

A light-emitting element 30 such as a light-emitting diode and a light-receiving element 31 such as a photo transistor, are provided opposing each other across the tape 19 in the above predetermined tape path in the vicinity of the tape cassette 11. The light-emitting element 30 is provided at a height position lower than that of the tape 19, so that the light-emitting element 30 does not interfere with the loading of the tape 19 when the tape 19 is drawn out of the tape cassette 11 and loaded into the predetermined tape path. Accordingly, the light-receiving element 31 is provided at a height position slightly higher than that of the tape 19, and the light-emitting element 30 emits light in an upwardly inclined direction towards the light-receiving element 31. When the magnetic tape exists between the elements 30 and 31, the light emitted from the light-emitting element 30 is blocked by the opaque magnetic tape and will not reach the light-receiving element 31. However, when all of the magnetic tape is drawn out of the tape cassette 11 and a transparent leader tape reaches a position between the elements 30 and 31, the light emitted from the light-emitting element 30 passes through the transparent leader tape and reached the light-receiving element 31.

A disc 46 shown in FIG. 2, is unitarily provided on the lower part of the reel base of the reel shaft 29 shown in FIG. 1. On the other hand, a disc 47 shown in FIG. 2, is unitarily provided on the lower part of a rotary shaft 32 of the gear 14 shown in FIG. 1. A plurality of light reflecting parts 46a and 47a and light non-reflecting parts 46b and 47b, are alternately arranged in a striped manner on these discs 46 and 47. Light-emitting elements 48 and 49 such as light-emitting diodes for emitting light to the respective discs 46 and 47, are connected to the power source through respective resistors R1 and R2. In addition, light-receiving elements 50 and 51 such as photo transistors, are arranged at positions for receiving light which is emitted from the light-emitting elements 48 and 49 and reflected by the respective discs 46 and 47. Collectors of the light- receiving elements 50 and 51 are connected to the power source, and emitters thereof are grounded through respective resistors R3 and R4. Emitter outputs from the light-receiving elements 50 and 51 are supplied to the microcomputer 45 through respective amplifiers 52 and 53.

The light-emitting element 30 is connected to the power source, through a resistor R5 and a transistor 54. A collector of the light-receiving element 31 is connected to the power source, and an emitter thereof is grounded through a resistor R6. An emitter output of the light-receiving element 31 is supplied to the microcomputer 45. A drum pulse having a frequency of 30 Hz, which is obtained in synchronism with the rotation of the rotary guide drum 20, is applied to a base of the transistor 54 through a terminal 55. The transistor 54 repeats ON and OFF states at the frequency of 30 Hz according to this drum pulse, and the light-emitting element 30 thus repeats blinking at the frequency of 30

Hz. The light-emitting element 30 may be designed to emit light continuously instead of blinking, however, the power consumption may be reduced by designing the light-emitting element 30 to blink.

Next, description will be given with respect to the general operation of the circuit system shown in FIG. 2. First, when carrying out normal recording and reproduction, the play switch 41 is closed or turned ON. By turning this play switch 41 ON, a signal for driving a reel motor (not shown) and a signal for driving a capstan motor (not shown) are respectively produced through output terminals 56 and 57 of the microcomputer 45. When the tape 19 is drawn out of the tape cassette 11 and loaded into the predetermined tape path and the recording or reproduction is carried out with the tape 19 traveling in the predetermined tape path, the light emitted from the light-emitting element 30 is blocked by the magnetic tape 19 and will not reach the light-receiving element 31. Accordingly, no output will be obtained from the light-receiving element 31. When all of the magnetic tape 19 is fed out from the supply reel 12 and the transparent leader tape connected at the end of the magnetic tape 19 reaches the position between the elements 30 and 31, the light emitted from the light-emitting element 30 will reach the light-receiving element 31 through the transparent leader tape, and an output obtained from the light-receiving element 31 is supplied to the microcomputer 45. The microcomputer 45 turns OFF the reel motor driving signal being produced through the output terminal 56 and the capstan motor driving signal being produced through the output terminal 57, according to this output of the light-receiving element 31. Hence, the recording and/or reproducing apparatus 10 stops its recording or reproducing operation in this state. The detection of the tape end by use of the above elements 30 and 31 is the same as in the conventional tape end detecting devices.

Next, description will be given with respect to the operation of the tape end detecting device during tape rewinding or tape fast-forwarding modes of the recording and/or reproducing apparatus 10. In these modes, a tape rewinding switch 42 or a tape fast-forwarding switch 43 is closed or turned ON. When the switch 42 or 43 is turned ON, the microcomputer 45 produces the reel motor driving signal through its output terminal 56. During the tape rewinding and fast-forwarding modes of the apparatus 10, the rewinding or fast-forwarding of the tape is carried out between the reels 12 and 13, in a state where the tape 19 is accommodated within the tape cassette 11. Accordingly, the elements 30 and 31 cannot detect the end of the tape, because the tape 19 is not drawn out of the tape cassette 11. In these tape rewinding and fast-forwarding modes of the apparatus 10, the rotary drum 20 does not rotate, and for this reason, the drum pulse is not applied to the transistor 54 through the terminal 54. Therefore, the transistor 54 is in the OFF state during these tape rewinding and fast-forwarding modes. Hence, the light-emitting element 30 does not emit light during the tape rewinding and fast-forwarding modes, and unnecessary power consumption is prevented.

While the tape rewinding or tape fast-forwarding operation is being carried out, the supply reel 12 and the gear 14 rotate at high speeds, and the discs 46 and 47 accordingly rotate at high speeds. As the discs 46 and 47 rotate, the light-emitting elements 48 and 49 emit light, and the light reflected by the light reflecting parts 46a and 47a of the respective discs 46 and 47 is received by the light-receiving elements 50 and 51. Because the non-reflecting parts 46b and 47b of the discs 46 and 47 do not reflect light, the light received by the light-receiving elements 50 and 51 is intermittent in accordance with the rotation of the discs 46 and 47. Therefore, the signals supplied to the microcomputer 45 from these light-receiving elements 50 and 51 are pulse signals.

When the tape rewinding switch 42 is closed, the microcomputer 45 detects the output of the light-receiving elemen 51 which is provided in relation to the take-up reel 13. On the other hand, when the tape fast-forwarding switch 43 is closed, the microcomputer 45 detects the output of the light-receiving element 50 which is provided in relation to the supply reel 12. As the end of the tape is reached upon completion of the tape rewinding or tape fast-forwarding operation, the reels 12 and 13 cannot rotate any further because the ends of the magnetic tape 19 are connected to the respective leader tapes which are fixed at their other ends to the hubs of the reels 12 and 13. Hence, the discs 46 and 47 stop rotating when the tape rewinding or tape fast-forwarding operation is completed. Thus, the output levels of the light-receiving elements 50 and 51 respectively remain constant at high or low level. The microcomputer 45 turns OFF the reel motor driving signal which is being produced through its output terminal 56 when it detects that the output levels of the light-receiving elements 50 and 51 have become constant, to stop the rotation of the reel motor.

Even during normal recording and reproduction modes of the apparatus 10, the reels 12 and 13 stop rotating when the end of the tape is reached, and the end of the tape may be detected from the outputs of the light-receiving elements 50 and 51. However, during the normal recording and reproduction modes, the rotational speeds of the reels 12 and 13 are slow, and the rotational speeds of the discs 46 and 47 are slow for this reason. Therefore, it will take time for the microcomputer 45 to detect the end of the tape. Hence, in the present embodiment of the invention, means for detecting the end of the tape during the tape rewinding and fast-forwarding modes and means for detecting the end of the tape during the normal recording and reproduction modes, are provided independently.

Figure 3A:
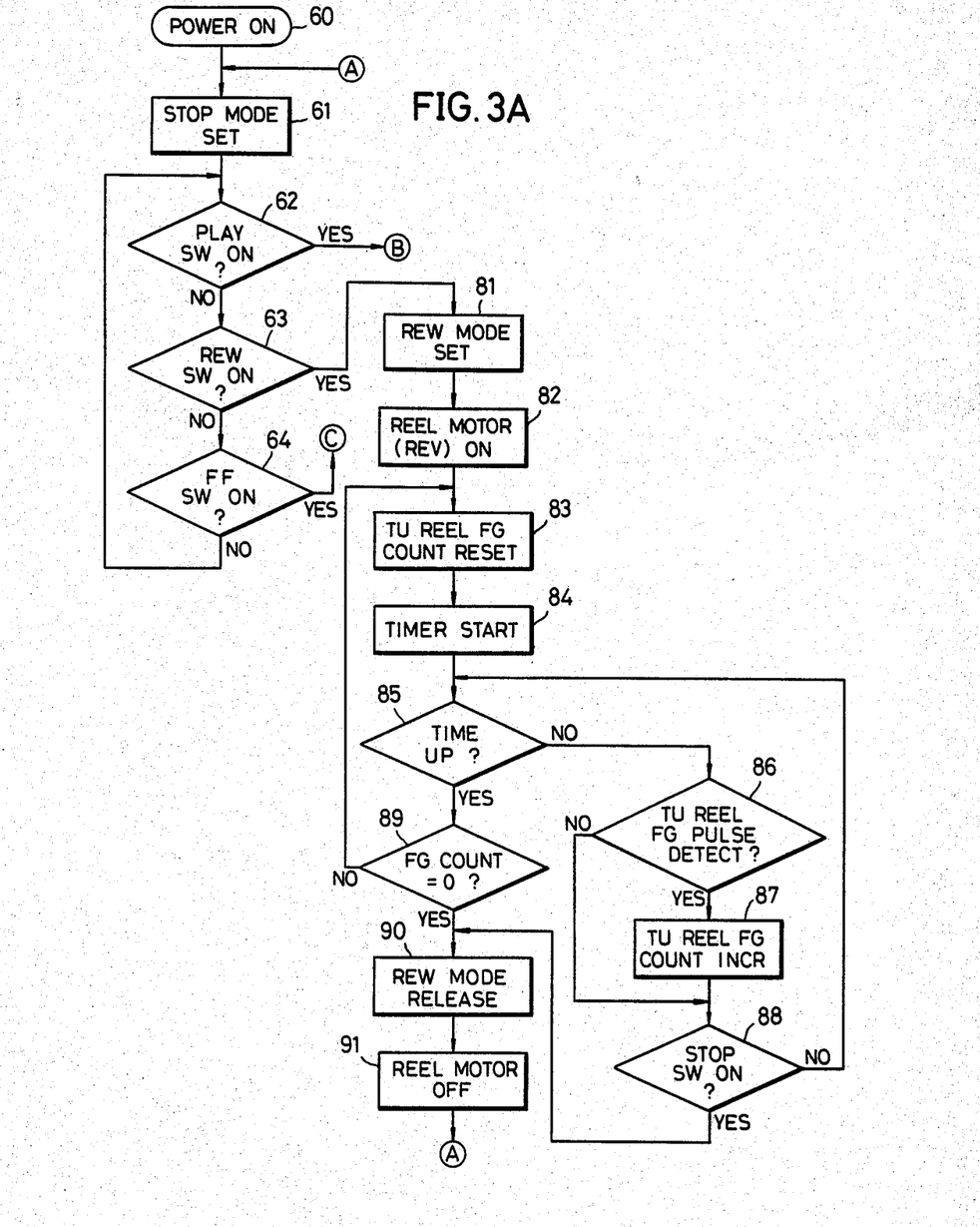
FIGS. 3A, 3B, and 3C respectively are flow charts for explaining the operation of a microcomputer in the circuit system shown in FIG. 2.
Figure 3B:
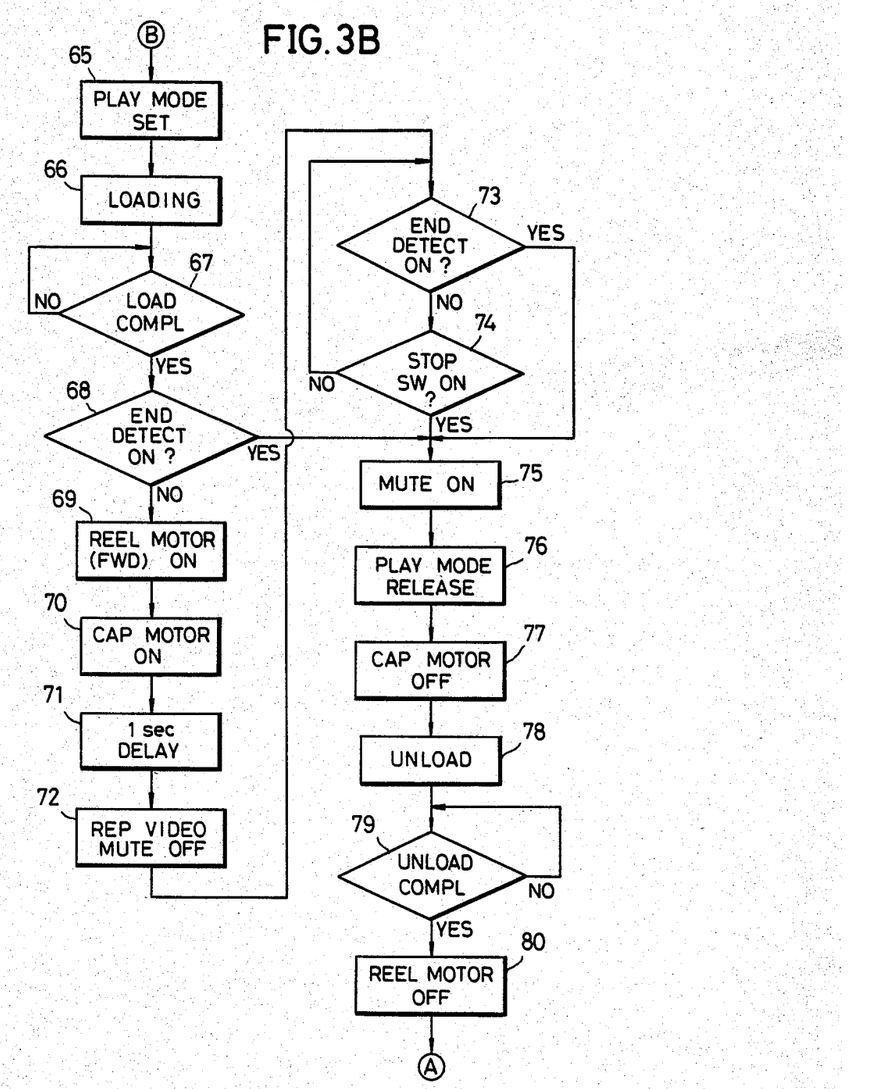
Figure 3C:
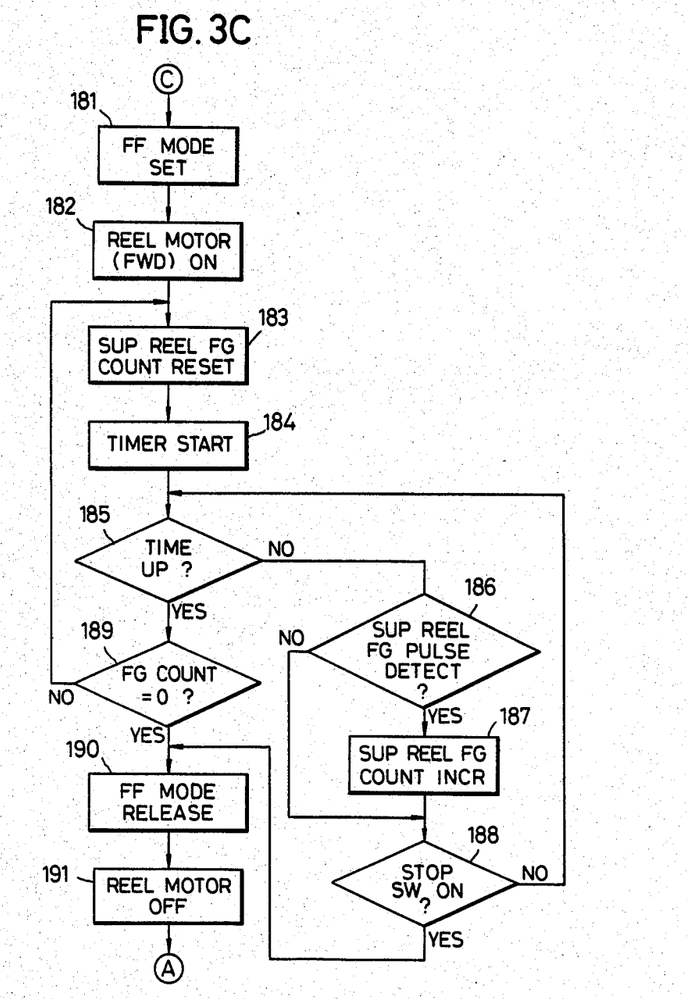

Next, description with respect to the operation of the microcomputer 45 will be given in more detail by referring to the flow charts shown in FIGS. 3A, 3B, and 3C. In FIG. 3A, the power source is turned ON at a step 60, and the stop mode is set at a subsequent step 61. A step 62 discriminates whether the play switch 41 is ON (closed). If the discrimination result at the step 62 is NO, a step 63 discriminates whether the tape rewinding switch 42 is ON. If the discrimination result at the step 63 is NO, a step 64 discriminates whether the fast-forwarding switch 43 is ON. If the discrimination result at the step 64 is NO, the operation returns to the step 62 to repeat the above described discriminations.

When the play switch 41 is turned ON so as to carry out normal reproduction, the discrimination result at the step 52 becomes YES. Hence, in this case, the operation advances to a step 65 shown in FIG. 3B wherein the play mode is set, as indicated by " B - B " in FIGS. 3A and 3B. Next, the loading mechanism is operated at a step 66 to carry out the tape loading, and the tape 19 is drawn out of the tape cassette 11 and loaded unto the predetermined tape path as described before in conjunction with FIG. 1. A step 67 discriminates whether the tape loading has been completed. If the step 67 discriminated that the tape loading has been completed, a step 68 then discriminates whether the light-receiving element 31 has detected light and the end of the tape has been detected. If the light-receiving element 31 has not detected light, the discrimination result at the step 68 is NO, and a step 69 is subsequently carried out in this case. The reel motor is rotated in the forward direction at the step 69, so as to rotate the take-up reel 13 in its tape take-up direction by way of the gear 14. The capstan motor is rotated at a step 70. A step 71 carried out a delay of one second, and the muting of the reproduced video signal is turned OFF at step 72 after the tape travel has stabilized.

A subsequent step 73 discriminates whether the light-receiving element 31 has detected light and the end of the tape has been detected. When the end of the tape has not been reached and the discrimination result at the step 73 is NO, a step 74 discriminates whether the stop switch 44 has been turned ON. If the discrimination result at the step 74 is NO, the operation returns to the step 73 to repeat the above described discrimination.

If the discrimination result at the step 68 immediately after completion of the tape loading is YES, that is, when the end of the tape has been reached at the point when the tape loading is completed, the muting is turned ON at a step 75. In addition, when the end of the tape is reached during the reproduction, the discrimination result at the step 73 becomes YES, and the operation advances to the step 75 in this case. Further, when the stop switch 44 is turned ON during the reproduction so as to stop the reproduction, the discrimination result at the step 74 also becomes YES in this case, and the operation similarly advances to the step 75.

Subsequent to the step 75, the play mode is cancelled at a step 76, and the capstan motor is stopped from rotating at a step 77. Next, the tape unloading is carried out at a step 78, to draw the tape which is in the predetermined tape path back into the tape cassette 11. A step 79 discriminates whether the tape unloading has been completed, and the reel motor is stopped from rotating at a subsequent step 80 if the tape unloading is completed. Thereafter, the operation returns to the step 61 shown in FIG. 3A wherein the stop mode is set, as indicated by "A—A" in FIGS. 3B and 3A.

Next, when the tape rewinding operation is to be carried out, the tape rewinding switch 42 is turned ON with the play switch 41 left in its OFF state. Thus, the discrimination result at the step 63 becomes YES in this case, and the operation advances to a step 81 wherein the tape rewinding mode is set. Then, the reel motor is rotated in the reverse direction at a step 82, and a counter for a frequency generator provided with respect to the take-up reel 13 is reset at a step 83. In FIG. 2, the light-emitting element 48, disc 46, and light-receiving element 50 constitute a frequency generator provided with respect to the supply reel 12. Thus, a pulse signal having a frequency in accordance with the rotational speed of the disc 46, that is, the rotational speed of the supply reel 12, is obtained from the light-receiving element 50. Similarly, the light-emitting element 49, disc 47, and light-receiving element 51 constitute the frequency generator provided with respect to the take-up reel 13. Hence, a pulse signal having a frequency in accordance with the rotational speed of the disc 47, that is, the rotational speed of the take-up reel 13, is obtained from the light-receiving element 51. The output of the light-receiving element 51 of the frequency generator provided with respect to the take-up reel 13 is used during the tape rewinding mode of the apparatus 10. This is the reason why the counter for counting the output pulses of the light-receiving element 51 is reset to zero at the step 83.

Next, a timer is started at a step 84. The time in this timer is set to 100 msec, for example. A step 85 discriminates whether this set time in the timer, that is, 100 msec, is up. Thus, the discrimination result at the step 85 is NO until the 100 msec is up, and is this case, a step 86 discriminates whether the output pulses of the light-receiving element 51 of the frequency generator provided with respect to the take-up reel 13 have been detected. When the output pulses of the light-receiving element 51 are detected, the counter which has been previously reset at the step 83 starts to count at a step 87, and the count in the counter is incremented with every incoming pulse. A step 88 discriminates whether the stop switch 44 has been turned ON. If the stop switch 44 has not been turned ON, the operation returns to the step 85 to repeat the above described operations. Accordingly, the above counter counts for 100 msec.

When the 100 msec is up, the discrimination result at the step 85 becomes YES, and the operation advances to a step 89 which discriminates whether the count in the counter is zero. While the tape rewinding operation is being carried out, the disc 47 continues to rotate and the counter accordingly continues to count. Therefore, the discrimination result at the step 89 is NO, and the operation returns to the step 83 which resets the counter to zero, and the operations described before are repeated.

When the end of the tape is reached and it no longer becomes possible to further rewind the tape, the disc 47 stops rotating, and the light-receiving element 51 stops producing the pulses. Accordingly, when the light-receiving element 51 stops producing the pulses while the timer is operating, the steps 85 and 89 are carried out, and then the steps 83 and 84 are carried out to reset the timer to zero and start the timer. However, because the pulses are not detected at the step 86 in this case, the discrimination result at the step 86 is NO and the operation advances to the step 88. This means that the step 87 for incrementing the count in the counter is not carried out. When the set time in the timer is up at the step 85, the step 89 discriminates whether the count in the counter is zero. In this state, the counter is not counting and remains in its state reset to zero. Thus, the discrimination result at the step 89 is YES, and the operation advances to a step 90. The tape rewinding mode is cancelled at the step 90, and the reel motor is stopped from rotating at a step 91. Thereafter, the operation returns to the step 61 wherein the stop mode is set, as indicated by "A - A" in FIG. 3A. Accordingly, the end of the tape is detected, and the mode of the apparatus 10 is set to the stop mode after a time in a range of 100 msec to 200 msec elapses from the time when the disc 47 stops rotating.

If the stop switch 44 is turned ON during the tape rewinding mode so as to stop the rewinding of the tape, the discrimination result at the step 88 becomes YES. Thus, in this case, the operation advances to the step 90. Thereafter, after the subsequent step 91 is carried out, the operation is returned to the step 61 wherein the the stop mode is set, as indicated by "A — A" in FIG. 3A.

Next, when the tape fast-forwarding operation is to be carried out, the fast-forwarding switch 43 is turned ON in a state where the play switch 41, rewinding switch 42, and the stop switch 44 are left in their OFF states. Accordingly, the discrimination result at the step 64 shown in FIG. 3A becomes YES, and the operation advances to a step 181 shown in FIG. 3C, as indicated by " C — C " in FIGS. 3A and 3C. The flow chart shown in FIG. 3C for fast-forwarding mode is similar to the part of the flow chart shown in FIG. 3A for the tape rewinding mode containing the steps 81 through 91. Hence, in FIG. 3C, those steps which correspond to the steps in FIG. 3A are designed by reference numerals having values obtained by adding 100 to the respective reference numerals of the steps in FIG. 3A. Because the flow chart shown in FIG. 3C can readily be understood from the description given before in conjunction with FIG. 3A, detailed description thereof will be omitted and description will only be given with respect to differing points.

The tape fast-forwarding mode is set at the step 181, and the reel motor is rotated in the forward direction at a step 182. The counter which counts the output pulses of the light-receiving element 50 of the frequency generator provided with respect to the supply reel, is reset to zero at a step 183. A timer is started at a step 184. The set time in this timer used during the tape fast-forwarding mode, is approximately equal to 500 msec, for example. A step 185 discriminates whether the 500 msec set in the timer is up, and a step 186 discriminates whether the output pulses of the light-receiving element 50 has been detected. The count in the counter is incremented at a step 187 if the output pulses of the light-receiving element 51 has been detected. A step 188 discriminates whether the stop switch 44 has been turned ON.

When the end of the tape is reached during the tape fast-forwarding mode, the disc 46 stops rotating and the counter does not count after being reset to zero. Accordingly, the discrimination result at a step 189 becomes YES, and the tape fast-forwarding mode is cancelled at a step 190. A step 191 stops the reel motor from rotating, and the operation then advances to the step 61 shown in FIG. 3A wherein the stop mode is set, as indicated by " A — A " in FIGS. 3C and 3A.

The reason why the output pulses of the light-receiving element 51 which is provided with respect to the take-up reel 13 are used during the tape rewinding mode, is as follows. That is, as the end of the tape is approaching during the tape rewinding mode, the rotational speed of the take-up reel 13 becomes higher than that of the supply reel, and the rotational speed of the disc 47 accordingly becomes higher than that of the disc 46. Hence, the frequency of the output pulses of the light-receiving element 51 becomes high, and it becomes impossible to detect the stoppage of rotation of the take-up reel within a short period of time. For similar reasons, the output pulses of the light-receiving element 51 which is provided with respect to the supply reel 12 are used during the tape fast- forwarding mode.

Further, the present invention is not limited to these embodiments, but various variations and further modifications may be made without departing from the scope of the present invention.

What is claimed is:

1. A tape end detecting device in a recording and/or reproducing apparatus, said recording and/or reproducing apparatus being loaded with a miniature type tape cassette comprising a supply reel and a take-up reel which have a tape wound thereon, said tape having the ends thereof fixed to said supply reel and said take-up reel, said recording and/or reproducing apparatus comprising a tape loading mechanism for drawing out said tape out of said miniature type tape cassette and loading said tape into a predetermined tape path during a recording or reproduction mode thereof, said tape loading mechanism being inoperative during a tape rewinding or tape fast-forwarding mode of said recording and/or reproducing apparatus so that rewinding or fast-forwarding of said tape is carried out by rotating said supply reel or said take-up reel within said miniature type tape cassette in a state where said tape is accommodated within said miniature type tape cassette, said tape end detecting device comprising: rotation detecting means for detecting rotation of said supply reel and said take-up reel of said miniature type tape cassette, and producing rotation detection signals in accordance with the rotation of said supply reel and said take-up reel, said supply reel and said take-up reel stopping rotation when all of the tape is fed out from one reel to the other reel and an end of the tape is reached, said rotation detecting means producing no rotation detection signal when said reels stop rotating; and
control means for carrying out counting with a predetermined time interval according to the rotation detection signals from said rotation detecting means during the tape rewinding or tape fast-forwarding mode, and stopping the tape rewinding or tape fast-forwarding mode when a count within said predetermined time interval is zero.

2. A tape end detecting device as claimed in claim 1 in which said control means carries out the counting according to the rotation detection signal of said rotation detecting means with respect to said take-up reel during the tape rewinding mode, and carries out the counting according to the rotation detection signal of said rotation detecting means with respect to said supply reel during the tape fast-forwarding mode.

3. A tape end detecting device as claimed in claim 1 in which said rotation detecting means comprises a first frequency generator provided with respect to said supply reel and a second frequency generator provided with respect to said take-up reel, said first frequency generator comprises a first disc which rotates together with said supply reel, a first light-emitting element for emitting light against said first disc, and a first light-receiving element for detecting light reflected by said first disc and producing a pulse signal having a frequency in accordance with the rotation of said first disc, and said second frequency generator comprises a second disc which rotates together with said take-up reel, a second light-emitting element for emitting light against said second disc, and a second light-receiving element for detecting light reflected by said second disc and producing a pulse signal having a frequency in accordance with the rotation of said second disc.

4. A tape end detecting device as claimed in claim 3 in which said first and second discs respectively have a plurality of light reflecting parts and light non-reflecting parts arranged in an alternate manner.

5. A tape end detecting device as claimed in claim 1 in which said rotation detecting means produces detection pulse signals in accordance with the rotation of said supply reel and said take-up reel, and said control means comprises counter means for counting output detection pulse signals of said rotation detecting means, timer means for timing a predetermined time, means for resetting said counter means to zero and starting said timer means every time said predetermined time in said timer means is up, and means for stopping said reels from rotating if a resulting count in said counter means is zero when said predetermined time in said timer means is up.

6. A tape end detecting device as claimed in claim 1 in which said rotation detecting means comprises first rotation detecting means for producing a detection pulse signal in accordance with the rotation of said supply reel and second rotation detecting means for producing a detection pulse signal in accordance with the rotation of said take-up reel, and said control means comprises first counter means for counting the output detection pulse signal of said second rotation detecting means during the tape rewinding mode, first timer means for timing a predetermined time, means for resetting said first counter means to zero and starting said first timer means every time said predetermined time in said first timer means is up, means for stopping said supply reel from rotating in a reverse direction if a resulting count in said first counter means is zero when said predetermined time in said first timer means is up, second counter means for counting the output detection pulse signal of said first rotation detecting means during the tape fast-forwarding mode, second timer means for timing a predetermined time, means for resetting said second counter means to zero and starting said second timer means every time said predetermined time in said second timer means is up, means for stopping said take-up reel from rotating if a resulting count in said second counter means is zero when said predetermined time in said second timer means is up.

7. A tape end detecting device as claimed in claim 6 in which said predetermined time in said second timer means is set larger than the predetermined time in said first timer means.

\* \* \* \* \*